(12) United States Patent
Finley

(10) Patent No.: US 7,913,407 B1
(45) Date of Patent: Mar. 29, 2011

(54) INCLINOMETER

(76) Inventor: Joseph B. Finley, Brooksville, FL (US)

( * ) Notice: Subject to any disclaimer, the term of this patent is extended or adjusted under 35 U.S.C. 154(b) by 14 days.

(21) Appl. No.: 12/566,589

(22) Filed: Sep. 24, 2009

(51) Int. Cl.
*G01C 9/12* (2006.01)

(52) U.S. Cl. ......................................................... 33/391

(58) Field of Classification Search ............. 33/391, 33/392, 395, 399, 370, 375, 366.24
See application file for complete search history.

(56) References Cited

U.S. PATENT DOCUMENTS

| | | | | |
|---|---|---|---|---|
| 1,449,669 A * | 3/1923 | Grossman | ................. | 33/368 |
| 1,597,960 A * | 8/1926 | Eltag | ................. | 33/368 |
| 1,847,652 A * | 3/1932 | Jenkins | ................. | 33/335 |
| 3,118,234 A * | 1/1964 | Wilson | ................. | 33/354 |
| 3,707,772 A * | 1/1973 | Cotter | ................. | 33/373 |
| 4,096,638 A * | 6/1978 | Schimming | ................. | 33/396 |
| 4,144,653 A * | 3/1979 | Gardner | ................. | 33/391 |
| 4,667,413 A * | 5/1987 | Pitts | ................. | 33/344 |
| 4,669,195 A * | 6/1987 | Griffin | ................. | 33/339 |
| 4,747,217 A * | 5/1988 | Austin | ................. | 33/391 |
| 4,901,443 A * | 2/1990 | Lakhman | ................. | 33/391 |
| 4,994,741 A * | 2/1991 | Takahashi | ................. | 33/366.24 |
| 4,995,169 A * | 2/1991 | Lunden | ................. | 33/534 |
| 5,136,784 A * | 8/1992 | Marantz | ................. | 33/366.24 |
| 5,680,707 A * | 10/1997 | Boelling | ................. | 33/333 |
| 5,740,881 A * | 4/1998 | Lensak | ................. | 33/391 |
| 5,956,855 A * | 9/1999 | Foss et al. | ................. | 33/391 |
| 5,977,922 A * | 11/1999 | Hemmingsen, II | ................. | 33/391 |
| 6,032,376 A * | 3/2000 | Shurtleff | ................. | 33/391 |
| 6,073,356 A * | 6/2000 | Li | ................. | 33/391 |
| D540,206 S * | 4/2007 | White | ................. | D10/69 |
| 7,380,345 B2* | 6/2008 | Li et al. | ................. | 33/345 |
| 2003/0167646 A1* | 9/2003 | Lin | ................. | 33/391 |

FOREIGN PATENT DOCUMENTS

GB 2177202 A * 1/1987

OTHER PUBLICATIONS

Veiga, M.M. et al., Manual for Training Artisanal and Small Scale Gold Miners, 2006, pp. 20-25, United Nations Industrial Development Organization (UNIDO), Vienna, Austria.

* cited by examiner

*Primary Examiner* — Yaritza Guadalupe-McCall
(74) *Attorney, Agent, or Firm* — Law Office of Steven R. Olsen, PLLC; Steven R. Olsen

(57) ABSTRACT

Embodiments of the invention provide an inclinometer that is compact, can be easily read with a vertical or horizontal line of sight, and/or readily convey a preferred range of incline angles for an operational sluice box.

15 Claims, 5 Drawing Sheets

| SCALE RANGE | COLOR CODE | INDICATION |
|---|---|---|
| 805 | RED | generally not suitable for gravitational filtering of gold particles or nuggets |
| 810 | PURPLE | suitable for mining very fine gold particles |
| 815 | BLUE | suitable for mining magnetite and fine/medium gold particles |
| 820 | GREEN | suitable for mining coarse gold nuggets and precious stones |

US 7,913,407 B1

INCLINOMETER

BACKGROUND AND SUMMARY

1. Field of the Invention

The invention relates generally to an inclinometer, and more particularly, but without limitation, to an inclinometer that is configured to measure the incline of a sluice box.

2. Description of the Related Art

Placer mining involves the gravitational separation of gold or other precious metals from alluvium. One known placer mining technique is to utilize a sluice. A sluice is a flat-bottomed trough with open ends. A sluice typically includes riffles, or traps, along a bottom interior surface. In operation, the sluice is disposed at an angle so that water (from a stream or other source) can flow into a head end of the sluice and exit at a tail end. Alluvium is added to the water at the head end, and the resulting slurry flows toward the tail. Within an optimal range of incline angle, volume, and flow rate, the sluice entraps heavier precious metals in the riffles and discharges lighter gangue at the tail end.

A portable sluice is often referred to as a sluice box. A consequence of portability is that the incline of the sluice box must be reset each time the sluice box is redeployed. Known methods for measuring the incline of a sluice box have many disadvantages, however. For instance, methods that rely on the measurement of vertical and horizontal differences between two locations on the sluice box may require multiple implements such as a ruler, level, and calculator. Inclinometers that require a horizontal line of sight may not be practical for a partially-submerged sluice box. In addition, where inclinometers merely provide an angular measurement value (e.g., in degrees) a user must interpret such value for relevance to sluicing or other application.

What is needed is compact inclinometer for use with a sluice box or other apparatus that can be easily read and understood.

SUMMARY OF THE INVENTION

Embodiments of the invention provide an inclinometer that can overcome one or more of the aforementioned limitations. Embodiments of the invention are compact, can be easily read with a vertical line or horizontal of sight, and/or readily convey a preferred range of incline angles for an operational sluice box.

An embodiment of the inclinometer includes: a side having a side scale on a surface of the side; a floor attached to the side, a plane of the side being orthogonal to a plane of the floor, the floor having a floor scale on a surface of the floor; a shaft coupled to the side, the shaft extending orthogonally from the side, the shaft being disposed parallel to the floor; a pendulum coupled to shaft, the pendulum having a first portion and a second portion, the first portion being orthogonal to the second portion, the first portion being disposed parallel to the face and the second portion being disposed parallel to the floor, the inclinometer configured such that the pendulum can rotate with respect to a longitudinal axis of the shaft, the inclinometer being configured to be read based on the first portion of the pendulum and the side scale, the inclinometer being configured to be read based on the second portion of the pendulum and the floor scale.

BRIEF DESCRIPTION OF THE DRAWINGS

The present invention will be more fully understood from the detailed description below and the accompanying drawings, wherein.

DETAILED DESCRIPTION

Embodiments of the invention now will be described more fully with reference to FIGS. 1 to 12, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
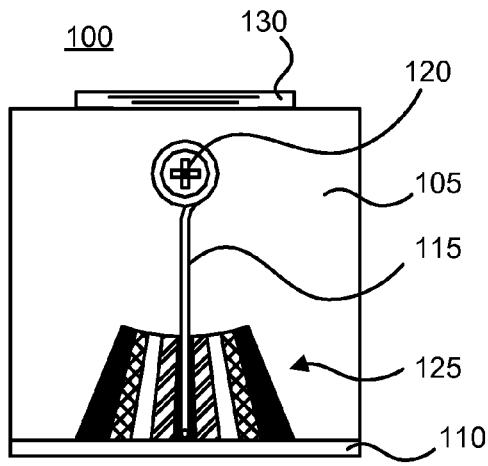
FIG. 1 is a front elevation view of an inclinometer, according to an embodiment of the invention.

FIG. 1 is a front elevation view of an inclinometer, according to an embodiment of the invention. As shown therein, an L-shaped body of an inclinometer 100 includes a side 105 portion in a first plane that is orthogonally disposed with respect to a second plane associated with a floor 110 portion. A pendulum 115 if movably affixed to a front surface of the side 105, in part, via a face retaining screw 120. A portion of the pendulum 115 is disposed in proximity of a side scale 125. The side scale 125 is disposed on the front surface of the side 105. A clip 130 is movably affixed adjacent to a rear surface of the side 105.

Variations to the configuration illustrated in FIG. 1 are possible. For instance, in an alternative embodiment, the side 105 and/or the floor 110 of the L-shaped body may not be rectangular in shape. The pendulum 115 may be configured differently than illustrated; for instance, the pendulum 115 may be more heavily weighted at or near the end adjacent to the floor 110. The shape and relative dimensions of the side scale 125 could also vary, according to design choice.

Figure 2:
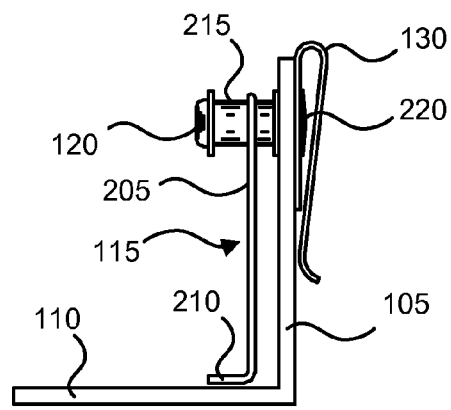
FIG. 2 is a side elevation view of the inclinometer in FIG. 1.

FIG. 2 is a side elevation view of the inclinometer in FIG. 1. As illustrated in FIG. 2, the pendulum 115 may include a vertical portion 205 and a horizontal portion 210. An internally-threaded shaft 215 supports a loop in a top end of the pendulum 115. The shaft 215 is rigidly fixed to the side 105 by the face retaining screw 120 and a rear retaining screw 220.

Variations to the configuration shown in FIG. 2 are possible. For example, the shaft 215 could be unthreaded and could be retained by a nut and bolt rather than the face retaining screw 120 and the rear retaining screw 220.

Figure 3:
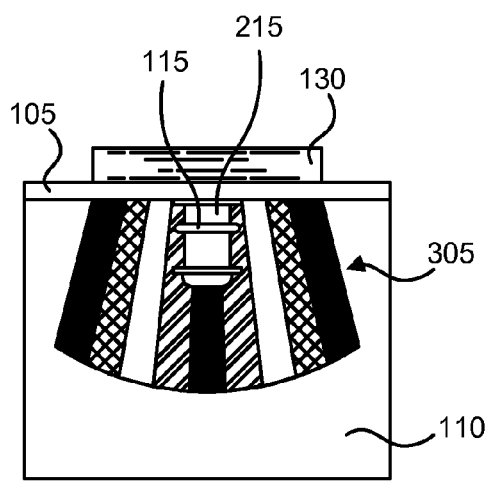
FIG. 3 is a top view of the inclinometer in FIG. 1.

FIG. 3 is a top view of the inclinometer in FIG. 1. This view illustrates that a floor scale 305 may be disposed on the floor 110. The floor scale 305 is preferably a continued projection of the side scale 125. Accordingly, a first incline measurement indicated by the vertical portion 205 of the pendulum 115 with respect to the side scale 125 will be the same a second incline measurement indicated by the horizontal portion 210 of the pendulum 115 with respect to the floor scale 305.

Figure 4:
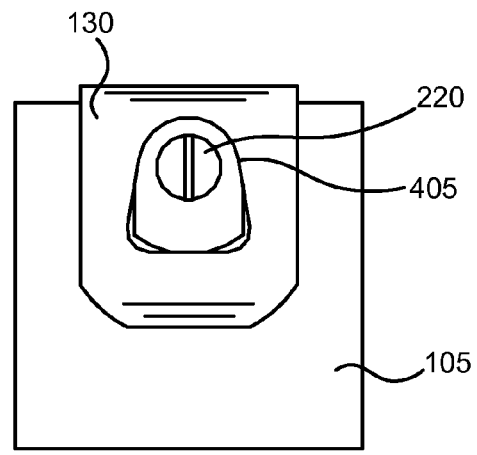
FIG. 4 is a rear view of the inclinometer in FIG. 1.

FIG. 4 is a rear view of the inclinometer in FIG. 1. As shown therein, the clip 130 may include a cutout 405 providing access to the rear retaining screw 120. The shape of the cutout 405 could vary according to design choice. Moreover, the rear retaining screw 220 need not have a slotted head, as illustrated.

Figure 5:
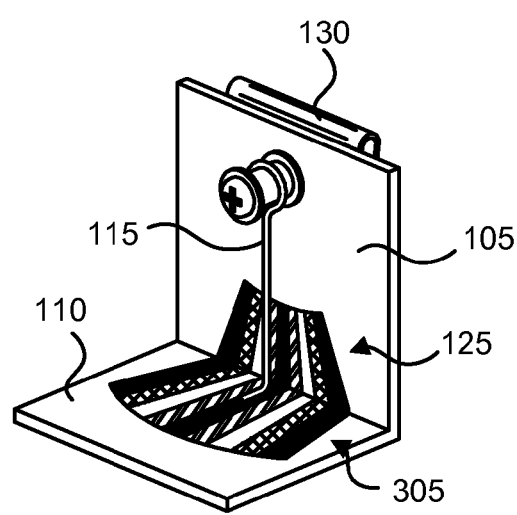
FIG. 5 is a perspective view of the inclinometer in FIG. 1.

FIG. 5 is a perspective view of the inclinometer in FIG. 1. FIG. 5 illustrates the relationship between the side scale 125 and the floor scale 305. In typical operation, the side scale 125 can be most easily read using a horizontal line of sight, and the floor scale 305 can be most easily read using a vertical line of sight. The floor scale may be especially advantageous to a user, for example, when the inclinometer 100 is affixed to a sluice box that is disposed in a stream bed.

Figure 6:
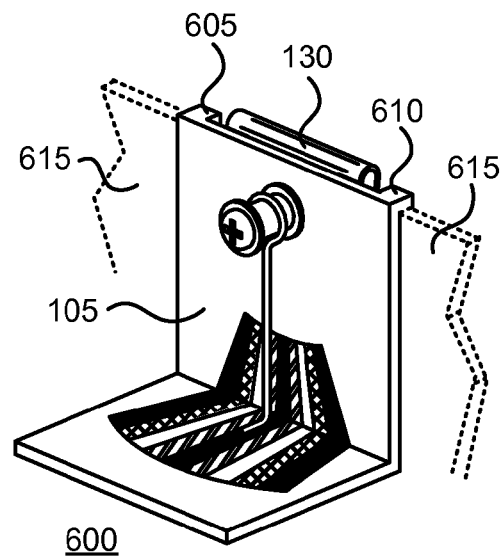
FIG. 6 is a perspective view of an inclinometer, according to another embodiment of the invention.

FIG. 6 is a perspective view of an inclinometer 600, according to another embodiment of the invention. As shown therein, tabs 605 and 610 may be attached to the side 105 of the L-shaped body. In operation, the inclinometer 600 is affixed to a wall 615 of a sluice box or other apparatus via the clip 130. Because the clip 130 may tend to pivot about the rear retaining screw 220, the tabs 605 and 610 can facilitate leveling of the inclinometer 600 with respect to a top edge of the wall 615. The illustrated tab features 605 and 610 can be used in combination with any other embodiment described in this specification.

Figure 7:
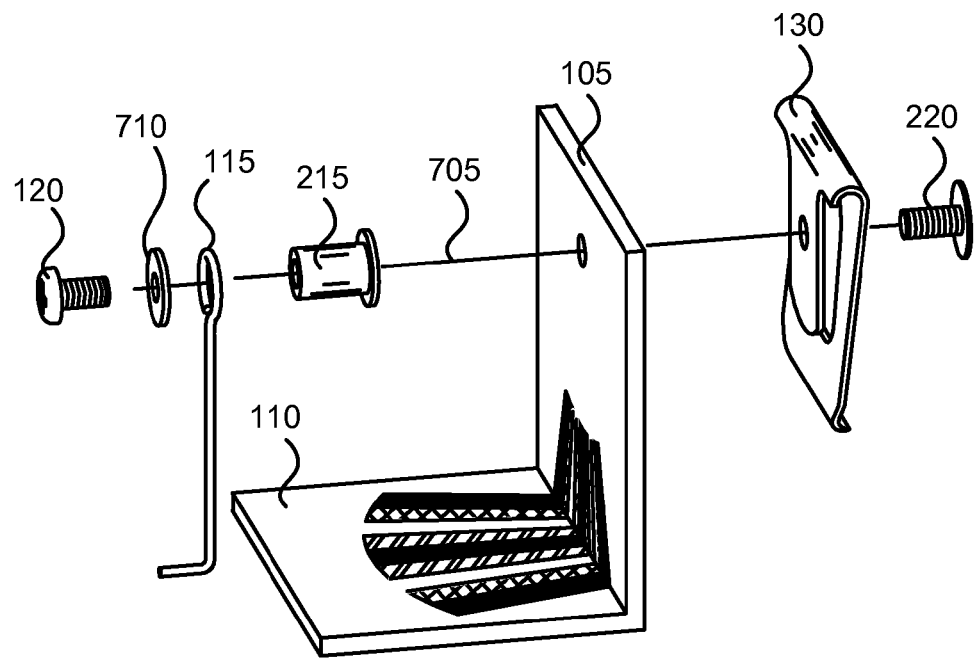
FIG. 7 is an exploded assembly view of the inclinometer in FIG. 1.

FIG. 7 is an exploded assembly view of the inclinometer in FIG. 1. FIG. 7 illustrates the assembly of components along a rotational axis 705. In addition, a washer 710 is most clearly shown in FIG. 7, although embodiments of the invention may also include more than one washer 710, or no washers 710, according to application needs. Many variations to the hardware stack-up are possible. For instance, although the illustrated embodiments show a shaft 215 that is rigidly fixed to the side 105 and a pendulum 115 that is movably attached to the shaft 215, and alternative embodiment includes a shaft that is movably attached to the side 105 and a pendulum that is rigidly fixed to the shaft.

Preferably, components shown in FIG. 7 and also described with reference to FIGS. 1-6 above are fabricated from stainless steel or aluminum for durability and to resist corrosion. Other materials, such as plastic, could alternatively be used for one or more of these same components.

FIGS. 8 through 11 illustrate alternative embodiments of the side scale 125 and floor scale 305.

Figure 8:
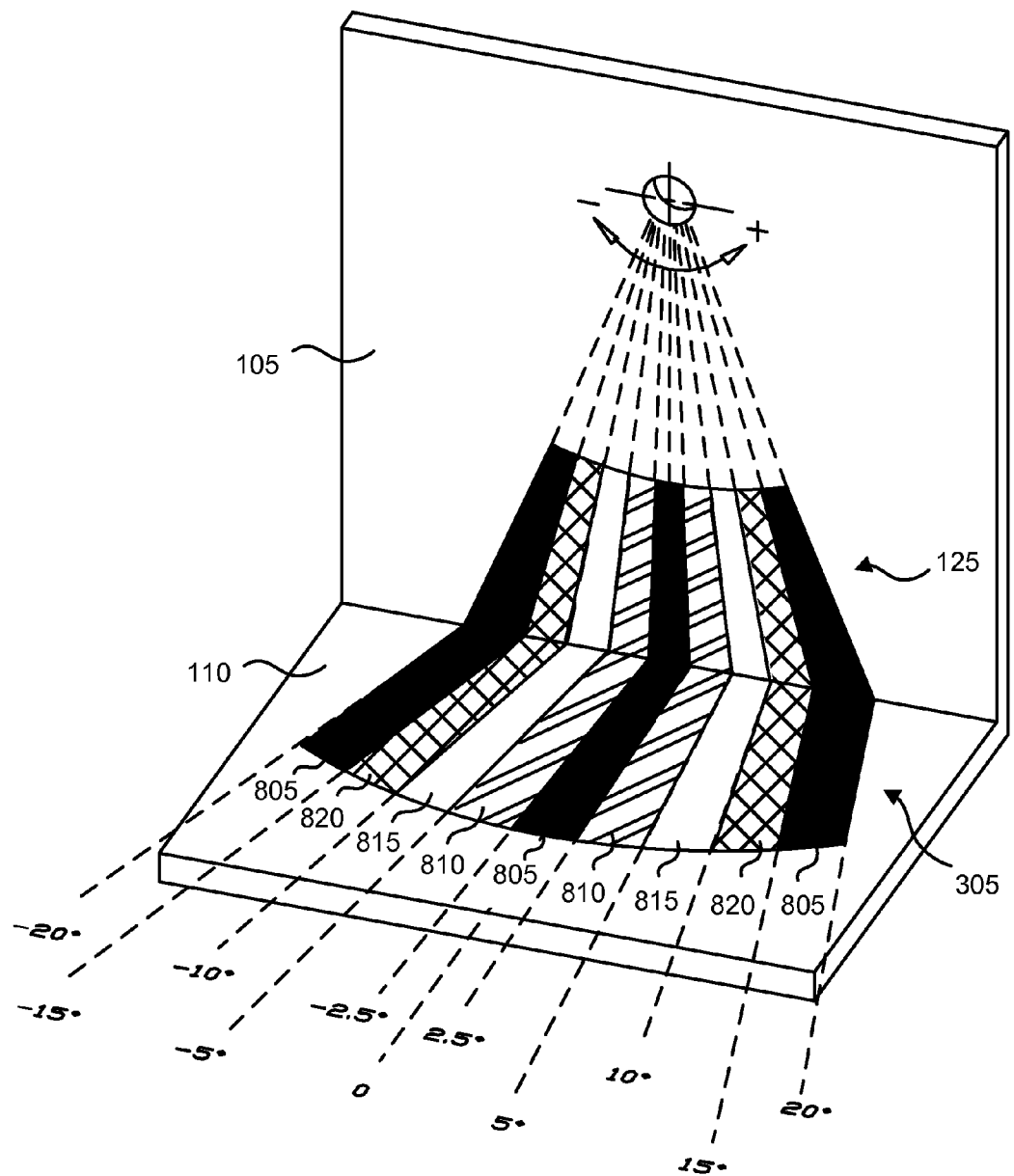
FIG. 8 is a perspective view of an inclinometer scale, according to an embodiment of the invention.

FIG. 8 is a perspective view of an inclinometer scale, according to an embodiment of the invention. Multiple scale ranges 805, 810, 815, and 820 are illustrated with respect to inclination angles. A first scale range 805 is disposed between −2.5 and +2.5 degrees, between +15 and +20 degrees, and between −15 and −20 degrees. A second scale range 810 is disposed between +2.5 and +5 degrees, and between −2.5 and −5 degrees. A third scale range 815 is disposed between +5 and +10 degrees, and between −5 and −10 degrees. A fourth scale range 820 is disposed between +10 and +15 degrees, and between −10 and −15 degrees. As shown in FIG. 8, the scale ranges 805, 810, 815, and 820 may apply uniformly to the side scale 125 and the floor scale 305.

The angles illustrated in FIG. 8 are defined with respect to the illustrated zero ("0") incline reference. When properly adjusted, a sluice box should have a negative incline from head to tail. The disclosed inclinometer is configured to be used on either side wall of a sluice box, however. Accordingly, the angle polarities illustrated in FIG. 8 and described in this specification are completely arbitrary.

Variations to the multiple scale ranges 805, 810, 815, and 820 are possible. For instance, variations of a few degrees of incline from the scale ranges disclosed in FIG. 8 and elsewhere in this specification are possible and are fully within the spirit of the disclosed invention. In addition, in an alternative embodiment, scale range 810 could be eliminated since some users may not be interested in mining very fine gold particles. Moreover, any two or more of the scale ranges could be combined. For example, scale ranges 815 and 820 could be combined into a single "operational" range between +5 and +15 degrees, and between −5 and −15 degrees of incline.

Although inclination angles could be expressed as a numeric value and marked on a surface of the side 105 or the floor 110, preferred embodiments do not include such marking. For ease of use in placer mining applications, a side scale 125 and/or floor scale 305 having a color code, textual, and/or graphical representation may be more advantageous.

Figures 9, 10:
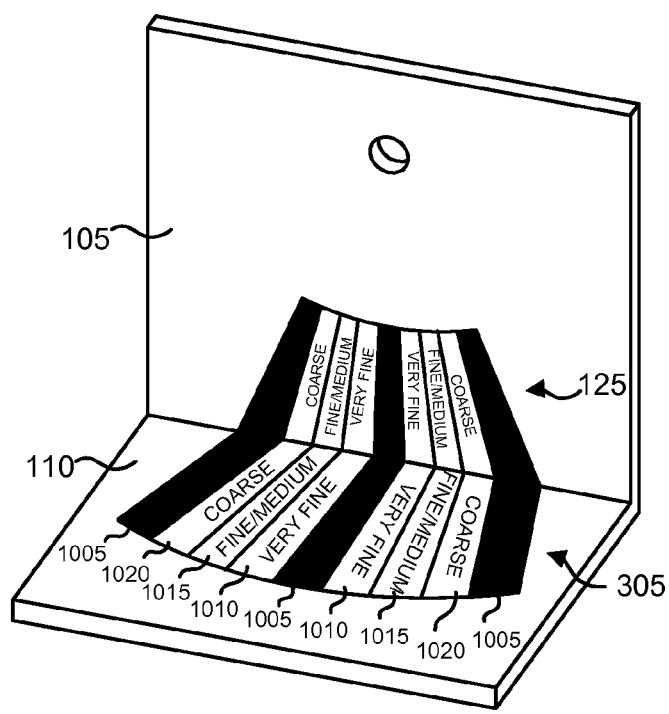
FIG. 9 is a table illustrating features of an inclinometer scale, according to an embodiment of the invention
FIG. 10 is a perspective view of an inclinometer scale, according to an embodiment of the invention.

FIG. 9 is a table illustrating features of an inclinometer scale, according to an embodiment of the invention. As shown therein, each scale range indicated in column 905 is associated with a corresponding color code in column 910 and a corresponding indication in column 915. With reference to FIGS. 8 and 9, scale range 805 can be colored red to indicate that incline angles within scale range 805 are generally not suitable for gravitational filtering of gold particles or nuggets. Scale range 810 can be colored purple to indicate that incline angles within scale range 810 are suitable for mining very fine gold particles. Scale range 815 can be colored blue to indicate that incline angles within scale range 815 are suitable for mining magnetite and fine/medium gold particles. Scale range 820 can be colored green to indicate that incline angles within scale range 820 are suitable for mining coarse gold nuggets and precious stones.

Variations to the color coding illustrated in FIG. 9 are possible. That is, the color coding assigned to any one or more of scale ranges 805, 810, 815, and 820 could be varied, according to design choice.

FIG. 10 is a perspective view of an inclinometer scale, according to an embodiment of the invention. Each of multiple scale ranges 1005, 1010, 1015, and 1020 may be associated with the same inclination angles described above with respect to corresponding scale ranges 805, 810, 815, and 820. Thus, scale range 1005 is disposed between −2.5 and +2.5 degrees, between +15 and +20 degrees, and between −15 and −20 degrees. Scale range 1010 is disposed between +2.5 and +5 degrees, and between −2.5 and −5 degrees. Scale range 1015 is disposed between +5 and +10 degrees, and between −5 and −10 degrees. Scale range 1020 is disposed between +10 and +15 degrees, and between −10 and −15 degrees. As shown in FIG. 10, the scale ranges 1005, 1010, 1015, and 1020 may apply uniformly to the side scale 125 and the floor scale 305.

The embodiment of FIG. 10 shows that scale ranges may be marked with text that is relevant to the mining application. For instance, scale range 1010 may be marked "very fine", scale range 1015 may be marked "fine/medium", and scale range 1020 may be marked "coarse."

Variations to the embodiment illustrated in FIG. 10 are possible. In alternative embodiments, other application-relevant text could be used for any one or more of the scale ranges 1005, 1010, 1015, and 1020. For instance, scale range 1020 could be marked with "nuggets" rather than "coarse." In addition, in an alternative embodiment, scale range 1010 could be eliminated since some users may not be interested in mining very fine gold particles. Moreover, any two or more of the scale ranges could be combined. For example, scale ranges 1015 and 1020 could be combined into a single scale range that is marked with "suitable", "good", or other qualitative language.

Figure 11:
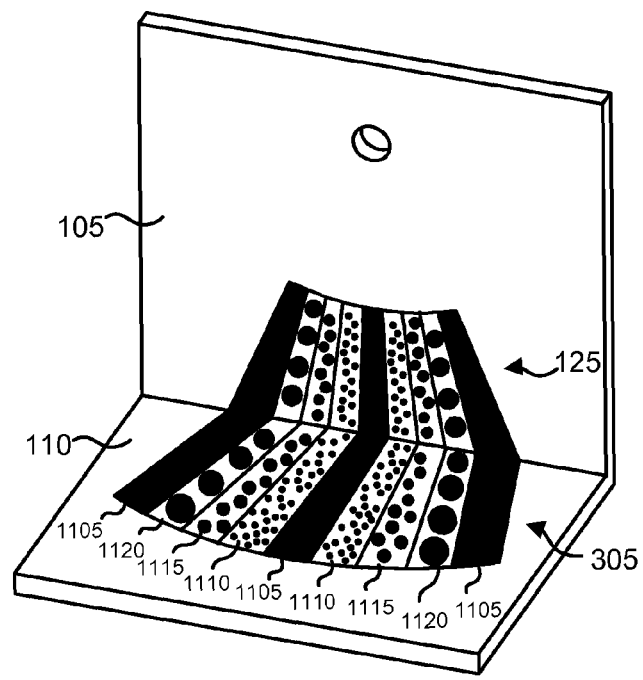
FIG. 11 is a perspective view of an inclinometer scale, according to an embodiment of the invention.

FIG. 11 is a perspective view of an inclinometer scale, according to an embodiment of the invention. Each of multiple scale ranges 1105, 1110, 1115, and 1120 may be associated with the same inclination angles described above with respect to corresponding scale ranges 805, 810, 815, and 820. Thus, a scale range 1105 is disposed between −2.5 and +2.5 degrees, between +15 and +20 degrees, and between −15 and −20 degrees. Scale range 1110 is disposed between +2.5 and +5 degrees, and between −2.5 and −5 degrees. Scale range 1115 is disposed between +5 and +10 degrees, and between −5 and −10 degrees. Scale range 1120 is disposed between +10 and +15 degrees, and between −10 and −15 degrees. As shown in FIG. 11, the scale ranges 1105, 1110, 1115, and 1120 may apply uniformly to the side scale 125 and the floor scale 305.

The embodiment of FIG. 11 shows that scale ranges may be marked with graphics that are relevant to the mining application. For instance, scale range 1110 may be marked with graphics that depict relatively fine-sized particles, scale range 1115 may be marked with graphics that depict relatively medium-sized particles, and scale range 1120 may be marked with graphics that depict relatively coarse-sized particles.

Variations to the embodiment illustrated in FIG. 11 are possible. For example, in an alternative embodiment, the graphics may show irregularly-shaped particles. Moreover, any two or more of the scale ranges could be combined. For example, in an alternative embodiment, there could be a scale range from +5 to +15 degrees (and −5 to −15 degrees) that includes a graphic portraying a gradual change in particle size.

The color codes described with reference to FIG. 9 could be painted onto the side 105 and/or floor 110. Alternatively, printed decals could be adhered to the side 105 and/or floor 110. Similarly, the text described with reference to FIG. 10 and/or the graphics described with reference to FIG. 11 could be painted, decaled, stamped, and/or etched onto the side 105 and/or floor 110. Other suitable processes could also be used, according to design choice.

Figure 12:
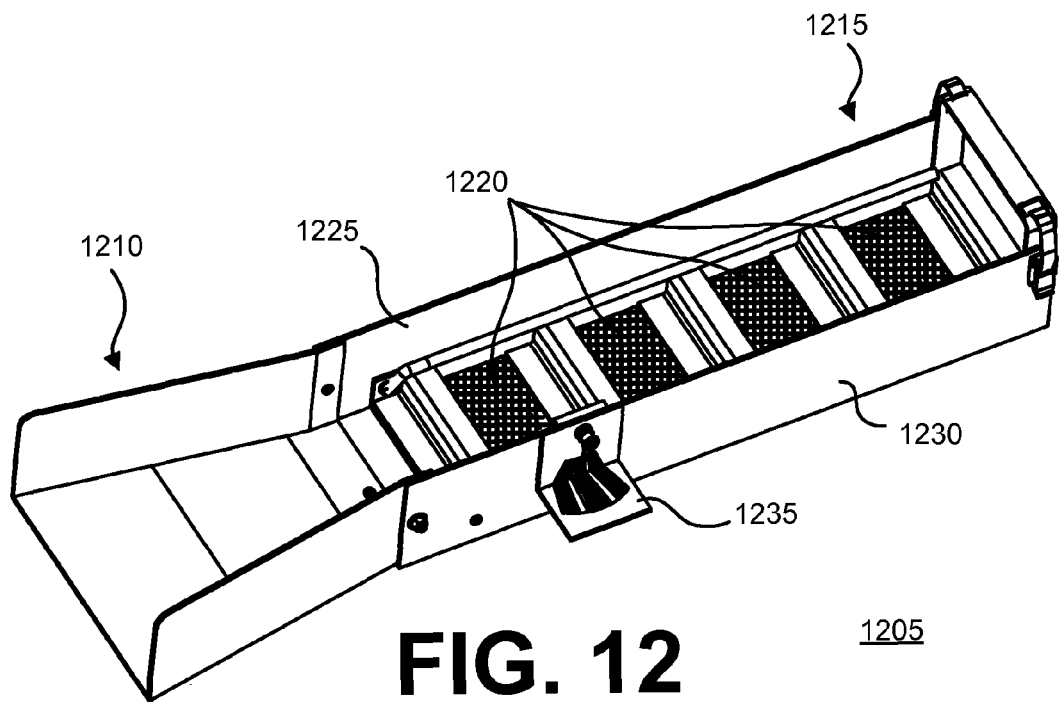
FIG. 12 is a perspective view of a sluice box, according to an embodiment of the invention.

FIG. 12 is a perspective view of a sluice box, according to an embodiment of the invention. As shown therein, a sluice box 1205 includes a head end 1210, a tail end 1215, riffles 1220, and side walls 1225 and 1230. An inclinometer 1235 is affixed to the sidewall 1230 to measure an incline of the sluice box 1205. The inclinometer 1235 may be any one of the inclinometers described herein and may include any one or more of the disclosed alternative features. In an alternative application, the inclinometer 1235 could be affixed to the side wall 1225 rather than the side wall 1235.

In the application environment illustrated in FIG. 12, the inclinometer 1235 is compact, easily read with either a vertical or horizontal line of sight, and quickly communicates application-relevant incline information to a miner or other user.

It will be apparent to those skilled in the art that modifications and variations can be made without deviating from the spirit or scope of the invention. For example, alternative features described herein could be used in combinations not expressly illustrated or described herein. Thus, it is intended that the present invention cover any such modifications and variations of this invention provided they come within the scope of the appended claims and their equivalents.

I claim:
1. An inclinometer comprising:
a side having a side scale on a surface of the side;
a floor attached to the side, a plane of the side being orthogonal to a plane of the floor, the floor having a floor scale on a surface of the floor;
a shaft coupled to the side, the shaft extending orthogonally from the side, the shaft being disposed parallel to the floor;
a pendulum coupled to shaft, the pendulum having a first portion and a second portion, the first portion being orthogonal to the second portion, the first portion being disposed parallel to the face and the second portion being disposed parallel to the floor, the inclinometer configured such that the pendulum can rotate with respect to a longitudinal axis of the shaft, the inclinometer being configured to be read based on the first portion of the pendulum and the side scale, the inclinometer being configured to be read based on the second portion of the pendulum and the floor scale.
2. The inclinometer of claim 1, wherein the side scale and the floor scale share a plurality of incline ranges, the plurality of incline ranges extending at least from +5 degrees to +15 degrees and −5 degrees to −15 degrees.
3. The inclinometer of claim 2, wherein the plurality of incline ranges includes:
a first range including incline between +5 and +10 degrees, and between −5 and −10 degrees; and
a second range adjacent to the first range, the second range including incline between +10 and +15 degrees, and between −10 and −15 degrees.
4. The inclinometer of claim 3, wherein the plurality of incline ranges further includes:
a third range adjacent to the second range, the third range including incline between +2.5 and +5 degrees, and between −2.5 and −5 degrees; and
a fourth range adjacent to a portion of the first range and a portion of the third range, the fourth range including incline between −2.5 and +2.5 degrees, between +15 to +20 degrees, and between −15 and −20 degrees.
5. The inclinometer of claim 1, wherein each of the side scale and the floor scale are color coded and do not include a numeric incline value.
6. The inclinometer of claim 1, wherein each of the side scale and the floor scale include textual references and do not include a numeric incline value.
7. The inclinometer of claim 1, wherein each of the side scale and the floor scale include graphical illustrations and do not include a numeric incline value, the graphical illustrations depicting a first plurality of particles in a first range and a second plurality of particles in a second range, the first plurality of particles being relatively larger than the second plurality of particles.
8. The inclinometer of claim 7, wherein the graphical illustration further include a third plurality of particles in a third range, the second plurality of particles being relatively larger than the third plurality of particles.
9. The inclinometer of claim 1, wherein the shaft is rigidly fixed to the side and the pendulum is movably attached to the shaft.
10. The inclinometer of claim 9, wherein the shaft is internally threaded.
11. The inclinometer of claim 1, wherein the shaft is moveably attached to the side and the pendulum is rigidly affixed to the shaft.

12. The inclinometer of claim 1, further comprising a clip coupled to the side, the clip configured to couple the inclinometer to a wall of a sluice box.

13. The inclinometer of claim 1, further comprising means for coupling the inclinometer to a wall of a sluice box.

14. The inclinometer of claim 1, further comprising a first tab and a second tab coupled to a top edge of the side, the top edge of the side being on an opposite edge of the side with respect to the floor, the first and second tabs extending orthogonally from the side in a direction opposite the shaft, each of the first and second tabs being configured to communicate with a top edge of a sluice box wall when the inclinometer is coupled to the sluice box wall.

15. The inclinometer of claim 1, further comprising means for leveling the inclinometer with respect to a top surface of a sluice box wall when the inclinometer is coupled to the sluice box wall.

* * * * *